United States Patent
Turkay et al.

(10) Patent No.: US 7,279,147 B2
(45) Date of Patent: Oct. 9, 2007

(54) METHOD OF PRODUCING AN ADSORBENT FROM RICE HULL ASH

(76) Inventors: Selma Turkay, Istanbul Technical University, Chemical Engineering Department, 80828, Maslak-Istanbul (TR); Sevil Ozgul Yucel, Istanbul Technical University, Chemical Engineering Department, 80828, Maslak-Istanbul (TR); Mehmet Tolay, Istanbul Technical University, Chemical Engineering Department, 80828, Maslak-Istanbul (TR); Serdar Erdaq, Istanbul Technical University, Chemical Engineering Department, 80828, Maslak-Istanbul (TR)

( * ) Notice: Subject to any disclaimer, the term of this patent is extended or adjusted under 35 U.S.C. 154(b) by 230 days.

(21) Appl. No.: 11/138,852

(22) Filed: May 25, 2005

(65) Prior Publication Data

US 2006/0269464 A1    Nov. 30, 2006

(51) Int. Cl.
*C01B 33/24* (2006.01)
(52) U.S. Cl. ............... 423/331; 502/407; 106/600; 106/602
(58) Field of Classification Search ........... 423/331; 502/407; 106/600, 602
See application file for complete search history.

(56) References Cited

U.S. PATENT DOCUMENTS 4,488,908 A * 12/1984 Goodwin et al. ........... 106/602
4,571,389 A *  2/1986 Goodwin et al.
4,619,911 A * 10/1986 Goodwin et al.

FOREIGN PATENT DOCUMENTS

WO    WO 2004/073600    *  9/2004

OTHER PUBLICATIONS

Answer 20 of 70 Chemical Abstracts on STN□□"Magnesium silicate synthesis from rice hull ash", Oezguel-Yuecel et al. Journal of the American Oil Chemists Society (2004), 81(6), 619-620. Abstract only.*

Ozgul-Yucel, Erdasg & Turkay—Magnesium Silicate Synthesis from Rice Hull Ash—Paper No. 310752 in JAOCS 81, 619-620—Jun. 2004 Turkey.
Kamath & Proctor—Silica Gel from Rice Hull Ash: Preparation and Characterization Pub. No. C-1998-0603-03R 1998 American Association of Cereal Chemists, Inc., USA.
Sun & Gong, Silicon-Based Materials from Rice Husks & Their Applications—Ind. Eng. Chem. Res. 2001, 40, 5861-5877 , USA.
Kalapathy, Proctor & Shultz, Production and Properties of Flexible Sodium Silicate Films From Rice Hull Ash Silica—Biosource Technology 72 (2000) 99-106, USA.
Yates & Caldwell, Regeneration of Oils Used for Deep Frying: A Comparison of Active Filter Aids, JAOCS, vol. 70 No. 5 (May 1993) Indiana, USA.
Patterson—Bleaching and Purifying Fats and Oils, Theory and Practice, pp. 99-101 American Oil Chemists' Society, Champaign, Illinois.
Ozgul-Yucel & Turkay, Purification of FAME by Rice Hull Ash Adsorption—JAOCS, vol. 80 No. 4 (2003) Istanbul Tech. University, Chem. Eng. Dept. 80626, Istanbul, Turkey.
Kalapathy & Proctor, A New Method For Free Fatty Acid Reduction in Frying Oil Using Silicate Films Produced from Rice Hull Ash—JAOCS, vol. 77 No. 6 (2006)Arkansas USA.
Carroll, Lipid Chromatographic Analysis—Sec. Ed. Revised & Expanded, vol. 1, Univ. of Rochester, N.Y., USA.
Proctor, X-Ray Diffraction and Scanning Electron Microscope Studies of Processed Rice Hull Silica, JAOCS, vol. 67, No. 9 (Sep. 1990) Ohio, USA.
Yates, Caldwell & Perkins, Diffuse Reflectance Fourier Transform Infrared Spectroscopy of Triacylglycerol and Oleic Acid Adsorption on Synthetic Magnesium Silicate, JAOCS, vol. 74, No. 3 (1997) USA.
Furman, Standard Methods of Chemical Analyis, Sixth Ed. vol. One—D. Van Nostrand Company, Inc. USA.
Sevil Ozgul-Yucel, et al.; Magnesium Silicate Synthesis From Rice Hull Ash; Journal of American Oil Chemists Society, vol. 81, No. 6; pp. 619-620;Jun. 2004.

* cited by examiner

*Primary Examiner*—Paul Marcantoni
(74) *Attorney, Agent, or Firm*—Robert L. Epstein; Epstein Drangel Bazerman & James, LLP

(57) ABSTRACT

The invention relates to a method for producing an adsorbent from rice hull ash comprising the following steps of extracting alkali from rice hull for obtaining sodium silicate solution, and mixing the sodium silicate solution with a salt, whereby precipitation of the adsorbent is obtained.

12 Claims, No Drawings

METHOD OF PRODUCING AN ADSORBENT FROM RICE HULL ASH

FIELD OF THE INVENTION

The invention relates to a method for producing an adsorbent from rice hull ash, and in particular for producing magnesium silicate.

BACKGROUND OF THE INVENTION

Adsorptive materials or adsorbents are solids which are able to adsorb considerable amount of gas or liquid, and are widely used in various industrial applications, such as water purifications, bleaching and purifying of fats and oils, drying of air, etc. Being one of the most important adsorbents, synthetic magnesium silicate has gained much attention in the last two decades for regeneration of used frying oil and purification of biodiesel in addition to having been used for column chromatography. Florisil®, Magnesol XL®, and Mizukaife F1® can be counted as being some of the commercially available synthetic magnesium silicates.

Synthetic magnesium silicate ($MgO.nSiO_2.xH_2O$) is produced by mixing solutions of sodium silicate and magnesium salts. Sodium silicate is usually prepared by smelting of quartz sand and sodium carbonate at about 1400° C. temperature in ordinary glass-melting furnace. Instead of this high temperature process, a simple low energy chemical method has been proposed to extract amorphous silica from rice hull ash, a co-product of rice industry (Kamath and Proctor, 1998).

Rice hulls or rice husk, a waste co-product of rice industry, contains over 60% silica and are evaluated as raw material for production of a number of silica based products.

When harvested from field, rice kernels are fully enveloped by rice hulls. After being harvested, first stage in milling is removal of hulls. Rice hulls comprise 20-25% of kernel, and mainly contain lignin, cellulose, hemicellulose and silica. Rice hulls are combusted to produce rice hull ash that contains more than 60% silica. Rice hull and rice hull ash have become a source for a number of silicon compounds, including silicon carbide, silicone nitrit, silicone tetrachloride, zeolite, pure silicon, silica, silica gel, sodium silicate.

SUMMARY OF THE INVENTION

The method for producing an adsorbent, namely magnesium silicate, from rice hull ash according to the invention comprises the steps of alkali extraction of silica from rice hull for obtaining sodium silicate solution, and mixing the sodium silicate solution with a magnesium salt, preferably aqueous magnesium sulfate solution whereby precipitation of the adsorbent is obtained.

Alkali solubilization or extraction of silica, according to the present invention, is achieved by means of mixing rice hull ash with a sodium hydroxide solution and boiling the mixture for one hour. After filtering of carbon residue, which is caused by incomplete burning of rice hull, sodium silicate solution is obtained. Various forms of silica and sodium silicate films are obtained from this sodium silicate solution. In the process, according to one preferred embodiment of the invention, magnesium silicate was precipitated from sodium silicate solution by mixing with magnesium sulfate solution.

$$nSiO_2 + 2NaOH \cdots Na_2O.nSiO_2 + H_2O \qquad (1)$$

$$Na_2O.nSiO_2 + mMgSO_4 \cdots MgO.nSiO_2.xH_2O + Na_2SO_4 \qquad (2)$$

The adsorbent obtained from rice hull ash according to present invention can alternatively include calcium silicate ($CaO.nSiO_2.xH_2O$). In this case, sodium silicate solution is mixed with a soluble calcium salt, preferably aqueous calcium chloride solution whereby precipitation of the adsorbent is obtained.

PREFERRED EMBODIMENT OF THE INVENTION

A rice hull ash sample was obtained from a rice mill in Thrace, Turkey. The silica content of the sample was 77%, and the surface area was 5.9 m$^2$/g. The first step of the process is alkali extraction from rice hull to obtain sodium silicate solution. For achieving this, 600 mL of 1M NaOH was added to 100 g of rice hull ash in a 1 L flask, covered with a watch-glass, and boiled for one hour with constant stirring using a magnetic stirring bar and a hot plate equipped with a magnetic stirring capacity. The resulting sodium silicate solution was filtered through Whatman #41 ashless filter paper to separate carbon residue, which was subsequently washed with 50 mL of boiling water. The filtrate and washing were combined and allowed to cool to room temperature. The silica content of this solution was found to be 68.2 g/L.

The second step of the process, according to preferred embodiment, is the precipitation of magnesium silicate. 250 mL of the sodium silicate solution was mixed with a magnesium sulfate solution prepared by dissolving 18.7 g of $MgSO_4.7H_2O$ in 150 mL of water at room temperature. A white precipitate is immediately formed. The precipitate is separated by vacuum filtering from the solution. The precipitate is first washed with distilled water, and then with acetone. The magnesium silicate precipitate was dried at 110° C. for three hours.

The X-ray diffraction patterns of magnesium silicate produced from rice hull and a commercial magnesium silicate sample (Florisil®) were almost identical. The chemical analysis results of the magnesium silicate from rice hull ash are illustrated in Table 1 below.

TABLE 1

Chemical compositions of magnesium silicate produced from rice hull ash and Florisil ®.

| | MgO (%) | SiO$_2$ (%) |
|---|---|---|
| Magnesium silicate from RHA | 12.9 | 62.8 |
| Florisil ® | 15.5 | 84.0 |

TABLE 2

Adsorption capacities and surface areas of magnesium silicate and Florisil ®

| | Adsorbed oleic acid (mg OA/g adsorbent) | Surface area (m$^2$/g) |
|---|---|---|
| Florisil ® | 87 | 181 |
| Magnesium silicate from RHA | 100 | 245 |

According to Table 1, magnesium silicate showed that it contained 12.9% of magnesium oxide and 62.8% of silicon dioxide. Surface area of magnesium silicate produced was determined as 245 m$^2$/g by the BET method (Table 2). Oleic acid adsorption capacity of the magnesium silicate produced from rice hull ash was determined by adding 0.5 g of the adsorbent to 50 mL of 0.02N oleic acid in hexane and mixing the mixture in a shaker bath for 30 minutes. A control experiment was also conducted using oleic acid solution without adsorbent. The residual oleic acid in solution was determined by alkali titration, and the amount of adsorbed oleic acid was found as 100 mg per gram of the magnesium silicate produced from rice hull ash.

The adsorbent according to present invention can be used optionally for various industrial applications including deacidification and purification of biodiesel, or purification of used frying oil, which is subsequently used for biodiesel production.

What is claimed is:

1. A method for producing an adsorbent from rice hull ash comprising the following steps of extracting alkali from rice hull ash with sodium hydroxide solution for obtaining sodium silicate solution, and mixing the sodium silicate solution with a salt, whereby precipitation of the adsorbent is obtained.

2. The method according to claim 1, wherein the salt is magnesium salt.

3. The method according to claim 2, wherein the magnesium salt is a magnesium sulfate solution.

4. The method according to claim 1, wherein the adsorbent is magnesium silicate.

5. The method according to claim 1, wherein the salt is calcium salt.

6. The method according to claim 5, wherein the calcium salt is a calcium chloride solution.

7. The method according to claim 1, wherein the adsorbent is calcium silicate.

8. The method according to claim 1, wherein the alkali extraction is achieved by means of mixing rice hull ash with a sodium hydroxide solution and boiling the mixture for optionally one hour.

9. The method according to claim 8, wherein carbon residue remaining by incomplete burning of rice hull is filtered.

10. The method according to claim 1, wherein the adsorbent has a minimum capacity of adsorbing oleic acid 100 mg per gram of adsorbent.

11. The method according to claim 1, wherein the adsorbent has a minimum surface area 245 $m^2$ per gram of adsorbent.

12. A method of using an adsorbent according to claim 1, wherein said use optionally comprises deacidification and purification of biodiesel, or purification of used frying oil which is subsequently used for biodiesel production.

* * * * *

UNITED STATES PATENT AND TRADEMARK OFFICE
CERTIFICATE OF CORRECTION

PATENT NO.         : 7,279,147 B2                                        Page 1 of 1
APPLICATION NO.    : 11/138852
DATED              : October 9, 2007
INVENTOR(S)        : Selma Turkay et al.

It is certified that error appears in the above-identified patent and that said Letters Patent is hereby corrected as shown below:

Title Page; item (76); should read;

The correct name of the inventor is: SERDAR ERDAG

Signed and Sealed this

Eighth Day of April, 2008

JON W. DUDAS
*Director of the United States Patent and Trademark Office*